Aug. 26, 1924.

N. D. STURGES

BATTERY

Filed May 15, 1922

1,506,278

INVENTOR
BY Norman Dexter Sturges
Pennie Davis Marvin & Edmonds
his ATTORNEYS

Patented Aug. 26, 1924.

1,506,278

UNITED STATES PATENT OFFICE.

NORMAN DEXTER STURGES, OF BELLEROSE, NEW YORK, ASSIGNOR TO MULTIPLE STORAGE BATTERY CORPORATION, A CORPORATION OF NEW YORK.

BATTERY.

Application filed May 15, 1922. Serial No. 561,065.

*To all whom it may concern:*

Be it known that I, NORMAN DEXTER STURGES, a citizen of the United States, residing at Bellerose, in the county of Nassau, State of New York, have invented certain new and useful Improvements in Batteries; and I do hereby declare the following to be a full, clear, and exact description of the invention, such as will enable others skilled in the art to which it appertains to make and use the same.

This invention relates to electric batteries and particularly to secondary storage batteries.

It is an object of the invention to provide a light, compact and relatively inexpensive battery which may be easily assembled, the construction being such as to ensure against leakage of the electrolyte.

A further object of the invention is the provision in a battery comprising matallic dividers and insulating spacers of a fluid-tight seal between the dividers and spacers.

Another object of the invention is the provision of resilient clamping means, whereby the elements of the battery are held in assembled relation.

Another object of the invention is an arrangement of the dividers and spacers which precludes short-circuiting of the cells by contact of the metallic objects with the exposed edges of the dividers.

Further objects and advantages of the invention will be apparent as it is better understood by reference to the following specification and accompanying drawings, in which Fig. 1 is a longitudinal section through a battery embodying the invention;

Figure 1:
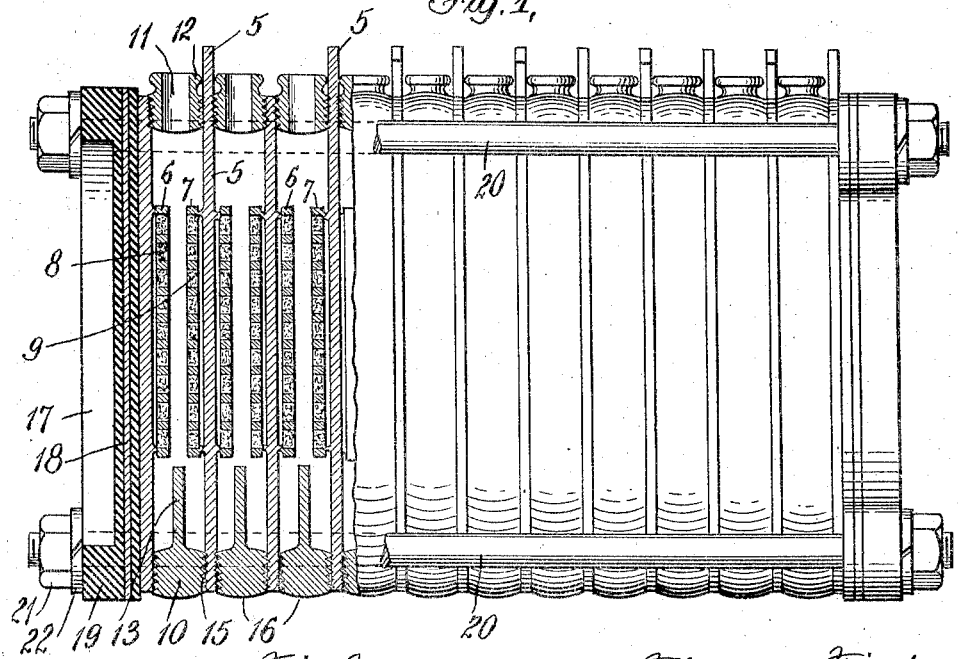
Figure 2:
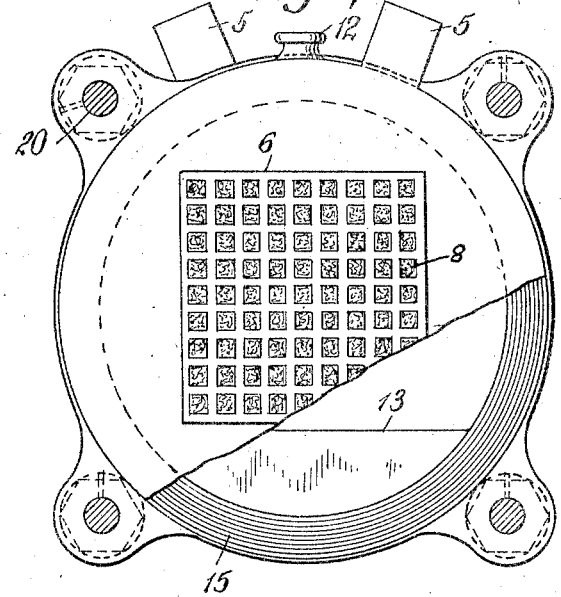
Fig. 2 is a transverse section through the battery.

The type of battery to which the improvements herein described relate comprises a plurality of dividers of rolled sheet lead to the opposite sides of which the active plates are preferably secured in any suitable manner. The dividers are preferably circular in form. The active plates consist of grids with the active material pasted thereon and may be of any suitable form. Annular spacers of suitable insulating material such as hard rubber or celluloid composition are disposed between the dividers forming therewith the cells or electrolyte containers of the battery, it being understood that the active plates on the opposite dividers are of opposite type, that is to say, positive and negative. The dividers form connectors or bus-bars between the active plates so that no external connections are required. The dividers and separators are held between clamps, rods being preferably used to connect the clamps and having nuts thereon whereby the pressure on the assembled elements may be adjusted.

In constructing a battery of the type described, one difficulty which is experienced is that of securing fluid-tight seals between the dividers and spacers. The elements may be cemented, but to ensure against leakage I prefer to employ the construction illustrated in the drawing, each spacer being provided on its opposite faces with a single sharp ridge or with concentric grooves and ridges, the latter being preferably sharp edged. When the dividers and spacers are clamped in assembled relation the ridge or ridges on the dividers are forced into the malleable lead, forming a complete seal which will prevent the escape of fluids. A suitable cement such as rubber, celluloid or asphaltum composition may be applied to the spacers and when the latter are assembled with the dividers, the cement fills the grooves and with the sharp edges assure a tight joint. The cement is not essential when a sharp ridge or ridges are provided. Of course the grooves may be otherwise than angular in section. Moreover, if cement is used the ridges need not be sharp as rounded edges will also give a good joint contact. The dividers may be provided with complementary ridges and grooves, forming with the spacers a tongue and groove construction, and the ridges and grooves may be formed on the dividers instead of on the spacers. These and other variations are within the purpose of the invention.

Since the material of which the battery is constructed is subject to shrinkage or like change owing to temperature and other variations, it is found that the clamping means may become loose after a time. To avoid this difficulty I prefer to provide resilient means between the clamping nuts or other devices and the frames. Ordinarily split washers or other forms of resilient washers may be used for this purpose. Spiral springs may be introduced at a slightly added expense. When the battery is assembled the nuts may be adjusted so that any shrinkage is taken up by the washers or springs and the clamping means continues to exert pressure on the assembled elements.

In the preferred construction the edges of the metal dividers are exposed, and to avoid contact of metallic objects therewith which would short-circuit the cells, the separators are preferably provided with edges which extend beyond the dividers. A convenient arrangement is to provide rounded edges on the spacers, but they may be caused to project beyond exposed edges of the dividers in any suitable way.

Referring to the drawing, 5 indicates a divider which, as stated, is constructed of rolled sheet lead and is preferably circular in form. To the opposite sides of the dividers, positive and negative plates 6 and 7 are secured preferably by a lead-burning operation which ensures a unitary structure. The end dividers are, of course, provided with plates on one side only and of the proper character to complete the battery. The plates 6 and 7 consist of grids supporting the pasted active material 8 and 9. This material may be of any suitable composition, such materials being well known in the art. The dividers 5 are mounted between spacers 10 of hard rubber, celluloid composition or other suitable acid-proof insulating material and are preferably circular in form, thus conforming to the shape of the dividers. Each spacer is provided with an inlet 11 through which the electrolyte may be introduced, the inlet being preferably surrounded by a neck 12 to reduce the liability of spilling and creeping of the electrolyte. At the bottom of each spacer a partition 13 is formed so that any material falling from the grids is prevented from bridging and thus short-circuiting the plates.

Figure 3:
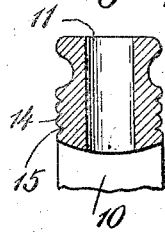
Fig. 3 is a section illustrating another form of joint between the dividers and spacers.
Figure 4:
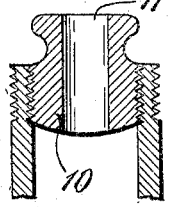
Fig. 4 is a section illustrating a slightly different form of joint.

In assembling the dividers and spacers they are preferably cemented with a suitable material such as rubber, celluloid or asphaltum cement. To ensure a tight joint the spacers are preferably provided on each side with one or more concentric ridges 14 with or without adjacent grooves 15. The ridge or ridges may be provided with sharp edges and the grooves may be angular or rounded or in fact of any desired shape. The edges of the ridges may also be rounded as indicated in Fig. 3, and both the dividers and spacers may be provided with complementary ridges and grooves as shown in Fig. 4. The cement fills the grooves or flows between the contacting surfaces if the dovetail construction is employed, and the assembled units are thus bound together in a substantially unitary structure. As indicated, the spacers are provided with rounded or other projecting edges 16 and prevent contact of metallic objects with the exposed edges of the dividers.

Figures 5, 6, 7:
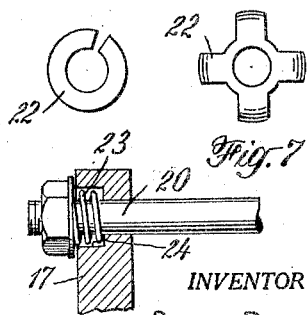
Fig. 5 is a detail of the resilient clamping means.
Fig. 6 is a detail of another resilient clamping device.
Fig. 7 is a detail of a slightly different resilient clamping device.

The assembled cells are supported between clamps 17 of suitable material having the requisite strength. Preferably the clamps are molded of hard rubber, celluloid or other suitable insulating material and are reinforced with metallic plates 18 embedded in the material. The clamps are preferably annular in form and are provided with lugs 19 having openings to receive rods 20, the latter being threaded and provided with nuts or other fastening devices 21 whereby the assembled cells are firmly clamped together and held in assembled relation. To avoid loosening of the clamping means by shrinkage, I provide resilient washers 22 between the nuts and the frames. These may be ordinary split washers as shown in Fig. 5 or of the type illustrated in Fig. 6. Any suitable resilient means may be used, and springs 23 may be sunk in recesses 24 as illustrated in Fig. 7, although this construction is obviously more expensive.

The battery is supplied with electrolyte such as sulfuric acid solution of the requisite strength. When charged it is ready for use.

The battery including the features hereinbefore described may be rapidly assembled, the parts being simple and easily constructed. The positive prevention of leakage of electrolyte and the avoidance of short circuits ensure the long and efficient life of the battery.

Various changes may be made in the details of construction and arrangement of the parts without departing from the invention or sacrificing any of the advantages thereof.

I claim:

1. In a battery cell the combination of insulating and metallic members forming the body of the cell and a fluid-tight joint between the abutting surfaces of the members consisting of a ridge on one of the members adapted to engage the adjacent surface of the other member.

2. In a battery cell the combination of insulating and metallic members forming the body of the cell and a fluid-tight joint between the abutting surfaces of the members consisting of a plurality of ridges and grooves on one of the members, the ridges being adapted to engage the adjacent surface of the member.

3. In a battery cell the combination of insulating and metallic members forming the body of the cell and a fluid-tight joint between the abutting surfaces of the members consisting of a ridge on the insulating member adapted to engage the adjacent surface of the metallic member.

4. In a battery cell the combination of insulating and metallic members forming the body of the cell and a fluid-tight joint between the abutting surfaces of the members consisting of a plurality of ridges and concentric grooves on the insulating member adapted to engage the adjacent surface of the metallic member.

5. In a battery cell the combination of insulating and metallic members forming the body of the cell and a fluid-tight joint between the abutting surfaces of the members consisting of a ridge and a complementary groove in the surfaces of the respective members.

6. In a battery cell the combination of insulating and metallic members forming the body of the cell and a fluid-tight joint between the abutting surfaces of the members consisting of a ridge and a concentric groove on one of the members, and a cement filling in the groove.

7. In a battery cell the combination of insulating and metallic members forming the body of the cell and a fluid-tight joint between the abutting surfaces of the members consisting of a plurality of concentric ridges and grooves on one of the members, and a cement filling in the grooves.

8. In a battery cell the combination of insulating and metallic members forming the body of the cell and a fluid-tight joint between the abutting surfaces of the members consisting of a ridge and a concentric groove on the insulating member, and a cement filling in the groove.

9. In a battery cell the combination of insulating and metallic members forming the body of the cell and a fluid-tight joint between the abutting surfaces of the members consisting of a plurality of ridges and concentric grooves on the insulating member, and a cement filling in the grooves.

10. In a battery cell the combination of insulating and metallic members forming the body of the cell and a fluid-tight joint between the abutting surfaces of the members consisting of a ridge and a complementary groove in the respective members, and a layer of cement between the surfaces.

11. A battery comprising insulating and metallic members arranged alternately and forming a plurality of cells, and means for resiliently clamping the members in assembled relation.

12. A battery comprising insulating and metallic members arranged alternately and forming a plurality of cells, means for resiliently clamping the members in assembled relation, including a frame embracing the members, adjustable mean for applying pressure to the members and resilient means adapted to be placed under tension by the adjustable means.

13. A battery comprising insulating and metallic members arranged alternately and forming a plurality of cells, means for resiliently clamping the members in assembled relation, including a frame embracing the members and having a plurality of rods extending longitudinally of the battery, nuts on the rods and resilient means adapted to be placed under tension by the nuts.

14. A battery comprising insulating and metallic members arranged alternately and forming a plurality of cells, means for resiliently clamping the members in assembled relation, including clamps engaging the end members of the battery, rods connecting the clamps, nuts on the rods and resilient washers between the nuts and clamps.

15. A battery comprising insulating and metallic members arranged alternately and forming a plurality of cells, means for resiliently clamping the members in assembled relation, including clamps of insulating material engaging the end members of the battery and adjustable means for applying pressure to the members, said clamps being reinforced with metal to prevent distortion thereof.

16. In a battery the combination of insulating spacers and metallic dividers arranged side by side alternately to form a plurality of cells, the spacers having a greater diameter at the medial planes of their peripheries than at their edges.

17. In a battery an annular spacer of insulating material having sharp edged ridges on the opposite sides thereof.

18. In a battery an annular spacer of insulating material having a plurality of ridges and concentric grooves on the sides thereof.

19. In a battery an annular spacer of insulating material having a greater diameter at the medial plane of its periphery than at the edges.

20. In a battery an annular spacer of insulating material having a greater diameter at the medial plane of its periphery than at the edges, and one or more ridges and concentric grooves in the sides thereof.

In testimony whereof I affix my signature.

NORMAN DEXTER STURGES.